(12) United States Patent
Harran et al.

(10) Patent No.: US 8,141,103 B2
(45) Date of Patent: Mar. 20, 2012

(54) SOLUTION FOR MODIFYING A QUEUE MANAGER TO SUPPORT SMART ALIASING WHICH PERMITS EXTENSIBLE SOFTWARE TO EXECUTE AGAINST QUEUED DATA WITHOUT APPLICATION MODIFICATIONS

(75) Inventors: Richard Michael Harran, Southampton (GB); Stephen James Hobson, Hampton (GB); Peter Siddall, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 1205 days.

(21) Appl. No.: 11/831,464

(22) Filed: Jul. 31, 2007

(65) Prior Publication Data

US 2008/0077939 A1 Mar. 27, 2008

(30) Foreign Application Priority Data

Aug. 5, 2006 (GB) .................................. 0615558.4

(51) Int. Cl.
*G06F 3/00* (2006.01)

(52) U.S. Cl. ...................................................... 719/314

(58) Field of Classification Search .................... 719/314
See application file for complete search history.

(56) References Cited

U.S. PATENT DOCUMENTS

| | | | |
|---|---|---|---|
| 5,465,328 A | 11/1995 | Dievendorff et al. | |
| 6,563,836 B1 * | 5/2003 | Capps et al. ................... | 370/412 |
| 6,817,018 B1 | 11/2004 | Clarke et al. | |
| 2003/0149726 A1 * | 8/2003 | Spear ........................... | 709/206 |

OTHER PUBLICATIONS

Arnold, Building Complex Models with Legos, 2002.*
"MQ Series: An Introduction to Messaging and Queuing," IBM, Document No. GC33-0805-00, 2nd Ed., Jun. 1995.

* cited by examiner

*Primary Examiner* — Lechi Truong
(74) *Attorney, Agent, or Firm* — Patents on Demand P.A.; Brian K. Buchheit; Scott M. Garrett

(57) ABSTRACT

The present invention discloses a queue manager that includes a smart alias function. The smart alias function can associate a queue name with two or more queues. The queues associated with the queue name for a given operation can be dependent upon programmatically determinable conditions. For example, the queue name (Queue A) can cause a message to be put in a Queue A1 when smart aliased. The same queue name (Queue A) can cause a message to be retrieved from Queue A2 when smart aliased. Additional processing can be performed against messages placed in Queue A1, and post processed messages can be placed in Queue A2. The queue manager can be a component that receives digitally encoded messages, that stores the received digitally encoded messages, and that provides the digitally encoded messages to authorized requesting software applications. The queue manager and the smart alias function can be software/firmware.

18 Claims, 2 Drawing Sheets

SOLUTION FOR MODIFYING A QUEUE MANAGER TO SUPPORT SMART ALIASING WHICH PERMITS EXTENSIBLE SOFTWARE TO EXECUTE AGAINST QUEUED DATA WITHOUT APPLICATION MODIFICATIONS

CROSS-REFERENCE TO RELATED APPLICATIONS

This application claims the benefit of British Patent Application No. 0615558.4 filed 5 Aug. 2006 and which is hereby incorporated by reference.

BACKGROUND

1. Field of the Invention

The present invention relates to the field of queue management during data processing and, more particularly, to a solution for modifying a queue manager to support smart aliasing which permits extensible software to execute against queued data without application modifications.

2. Description of the Related Art

Just as computers have become more and more prevalent in everyday life, networks of linked computers have become important in distributing information amongst computer users. Through such networks, computer users can share information creating a virtual publishing medium which has become a viable alternative for the print medium.

A network of computers can be any number of computers that are able to exchange information with one another. The computers may be arranged in any configuration and may be located in the same room or in different countries, so long as there is some way to connect them together (for example, by telephone lines or other communication systems) so they can exchange information. Just as computers may be connected together to make up a network, networks may also be connected together through tools known as bridges and gateways. These tools allow a computer in one network to exchange information with a computer in another network.

In order to account for the fact that different computers connected to such a network may operate using different protocols and/or data formats, and also that different computers may be located in different time zones, asynchronous messaging and queuing software products have been developed.

Message queuing and commercially available message queuing products are described in "Messaging and Queuing Using the MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). IBM and MQSeries are trademarks of IBM Corporation. IBM's MQSeries messaging software products (now called Websphere MQ, "Websphere" is a trademark of IBM Corporation) provide transactional messaging support, synchronizing messages within logical units of work in accordance with a messaging protocol which gives assured once and once-only message delivery even in the event of system or communications failures. Websphere MQ products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept "in doubt" and can be backed out atomically in the event of a failure. This message transmission protocol and the associated transactional concepts and recovery facilities are described in international patent application WO 95/10805 and U.S. Pat. No. 5,465,328, which are incorporated herein by reference.

In such a messaging and queuing system, the computer system that receives information over the network stores such received information in the form of messages in a queue. The computer system need not be operable when the messages are received over the network (e.g., the computer may be turned off if it is the middle of the night in the local time zone). The messages are simply stored in the queue for later retrieval at a time when the receiving computer system makes a request to retrieve a message from the queue. The receiving computer processor requests a specific message from the queue and this message is de-queued and provided to the receiving computer processor for processing thereby.

FIG. 1 (Prior Art) shows a conventional a simplistic queuing system 100. In system 100, application 105 can exchange digital information with remotely executing application 125 over network 115. Each application 105, 125 can have an associated queue manager 110, 120.

More specifically, an application 105 (running on a first machine) can identity a message to send to an application 125 (running on a second machine). Initially, the application 105 can send the message to a queue manager 110, which can also be running on the first machine. The queue manager 110 can then send the message over the network 115 to a queue manager 120 running on the second machine.

When utilizing HTTP based PUT and GET commands, the message transfer of system 100 can proceed as follows. Application 105 can issue a PUT (e.g., HTTP PUT) command to the queue manager 110 to put (or write) the message onto a queue (which is a particular storage location in memory). Application 125 can then issue a GET (e.g., HTTP GET) command to the queue manager 120 to get (or read) the message from the queue. In system 100, the applications 105 and 125 use the same name for the queue so that application 125 is able to reference and acquire the same message that was PUT into a queue by the application 105.

After the applications 105 and 125 have been developed, it may become desirable to insert extra processing into the architecture of system 100. For example, a customer might want to insert an additional application which collects statistical information about the messages as they are PUT to the queue. Additionally processing can be desired on either end of a message conveyance. That is an administrator of application 105 can desire processing occur relating to data of queue manager 110 in a manner transparent to an administrator of application 125. Similarly, an administrator of application 125 or queue 120 can wish to add an additional software routine in a fashion that is non-destructive to pre-existing communications with application 105.

Adding additional processing, however, results in referencing problems. That is, the application 105 that PUTs a message in a queue needs to reference the message and queue in the same matter and the application 125 with GETs the message. In other words, a conventional technique used to insert such extra processing into a queue stream is to "split" the existing queue into two. To illustrate, suppose the existing queue is called "A". Splitting the queue involves defining two new queues, called "A1" and "A2". The application 105 needs to modify code so that instead of PUTting messages to Queue A, the application 105 instead PUTs to Queue A1. Similarly, application 125 must be modified so that commands that originally GET a message from Queue A are changed to GET the message from Queue A2 instead. The extra processing (for example, collecting statistics) is implemented between Queue A1 and Queue A2. That is, the additional processing gets a message from Queue A1, executes necessary code associated with the processing, and places the processed message in Queue A2. This conventional technique permits code executing between Queue A1 and Queue A2 to be modified as necessary over time in a non-interfering manner.

An obvious disadvantage of this technique is that code of both the original applications 105 and 125 must be modified to reference Queue A1 and Queue A2, instead of referencing Queue A. Deployment of the modified applications 105 and 125 can be disruptive and expensive. Further, it requires a whole-scale change to be made to each queue utilizing application. Unmodified applications, will malfunction once the change has been implemented and modified applications will not function correctly until the change is implemented. Hence, the modified applications must be deployed simultaneously and comprehensively.

FIG. 2 (Prior Art) is a schematic diagram showing a system 200 that illustrates one pre-existing extension or modification to conventional queuing techniques. Specifically, system 100 permits queue aliasing. Queue aliasing permits a queue manager 220 to receive a message PUT to Queue A by application 205 through manager 210 and network 215. The received message is actually put to queue A1 225 instead of a non-existent Queue A, in accordance with the configurable mappings specified in alias table 230.

In a specific example of system 200, IBM's WebSphere Application Server has a platform messaging (PM) functionality which implements something called a "queue destination" which can support "mediations" (e.g., aliasing). This is achieved by allowing the queue destination to include separate "mediation points" and "queue points". Specialized interfaces are provided for applications called "mediations". These specialized interfaces can allow mediations to get messages from the mediation point (e.g., an original queue designator), and put them to the queue point (e.g., an alias). When conventional applications 205 put messages onto a queue destination (e.g., queue A), the messages are actually added to the mediation point (e.g., Queue A1) and when conventional applications 205 get messages from the queue destination (e.g., Queue A), the messages are actually got from the queue point (e.g., Queue A1).

Hence, in system 200, if we have an existing Queue A1 225, we can define an alias "A" in table 230 such that when an application 205 PUTs to Queue A, the queue managers 210, 220 can PUT the message on Queue A1 225. Use of conventional queue aliasing as shown in system 200 fails to result the problem of adding additional processing code without modifying pre-existing application 205 code. That is, aliasing of system 200 permits an application 205 to GET and PUT messages to a Queue A, when an actual queue for these messages is Queue A1. System 200 does not split the queue into two new queues so that additional processing can be performed between the split queues.

Appreciably, attempting to implement additional processing without splitting a queue can result in synchronization and interference problems. That is, a client can attempt to retrieve or GET a queued message before additional processing is performed or while additional processing is executing, both of which result in unpredictable processing behavior, which can cause computing errors.

SUMMARY OF THE INVENTION

The present invention discloses a solution for smart queue aliasing that permits a queue to be split into two or more segments, while permitting references to the queue to remain unchanged. In the solution, extra processing functionality can be added between the split queues without a need to modify the applications which send messages to the queue manager or which retrieve messages from the queue manager. In one embodiment, the solution can extend an existing queue manager, which already has a basic alias function, to permit smart aliasing without negatively impacting other functions of the extended queue manager.

The present invention can be implemented in accordance with numerous aspects consistent with the material presented herein. For example, one aspect of the present invention can include a queue manager that includes a smart alias function. The smart alias function can associate a queue name with a two or more queues. The queues associated with the queue name for a given operation can be dependent upon programmatically determinable conditions. For example, the queue name (Queue A) can cause a message to be put in a Queue A1 when smart aliased. The same queue name (Queue A) can cause a message to be retrieved from Queue A2 when smart aliased. Additional processing can be performed against messages placed in Queue A1, and post processed messages can be placed in Queue A2. The queue manager can be a component that receives digitally encoded messages, that stores the received digitally encoded messages, and that provides the digitally encoded messages to authorized requesting software applications. The queue manager and the smart alias function can be software/firmware implemented.

Another aspect of the present invention can include a method of queuing electronic messages. The method can include a step of receiving a first command to place an electronic message in a queue that digitally stores electronic messages. The first command can refer to a queue using a first reference (i.e., PUT to Queue A). The first reference can be mapped to a second reference (i.e., Queue A1) for message intake purposes, where the second reference can be a unique reference for a first queue (Q1). The received electronic message can be stored in the first queue (Q1). A programmatic action can execute, which uses at least a portion of the electronic message as input. After executing the programmatic action, the electronic message can be moved from the first queue (Q1) to a second queue (Q2), which is different from the first queue. A second command (e.g., GET or BROWSE) can be received to retrieve the electronic message from a queue that digitally stores electronic messages. The second command can refer to a queue using the first reference (Queue A). The first reference can be mapped to a third reference (i.e., Queue A2) for message retrieval purposes. The third reference (Queue A2) can be a unique reference for the second queue (Q2). The requested electronic message can be conveyed from the second queue (Q2) to a requesting entity.

Still another aspect of the present invention can include a method of handling messages within a queue manager software program. The method can start with a queue manager software program, which receives a message into a first queue. The message can be received from an application, which specifies the queue name for the first queue to the queue manager software program. The queue manager software program have an alias function which checks, for each message received from an application, whether the queue name specified by the application has a defined alias queue name. When the queue name does have a defined alias, the queue manager software application can place the message into a second queue having the defined alias queue name. When the queue name does not have a defined alias, the queue manager software application can place the message into the first queue. The alias function can be modified so that the alias function carries out the following Steps A and B, for each message received from an application. In Step A, when an application that is communicating with the queue manager software program is specifying the defined alias queue name to the queue manager software program and is providing a message to be stored onto a queue, the queue manager software program can place the message onto the first queue. In Step B, when an application that is communicating with the queue manager software program is specifying the defined alias queue name to the queue manager software program and is receiving a message from a queue, the queue manager software program can receive the message from the second queue.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
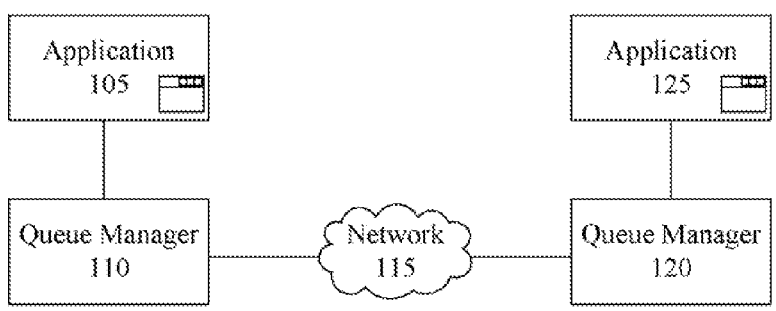
FIG. 1 (Prior Art) is a schematic diagram showing a conventional queuing system.
Figure 2:
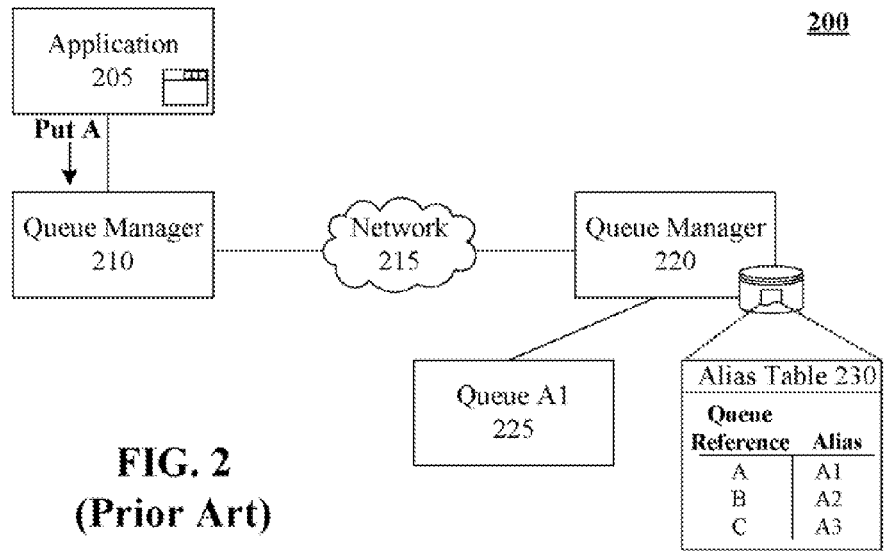
FIG. 2 (Prior Art) is a schematic diagram showing a system that illustrates conventional queue aliasing.
Figure 3:
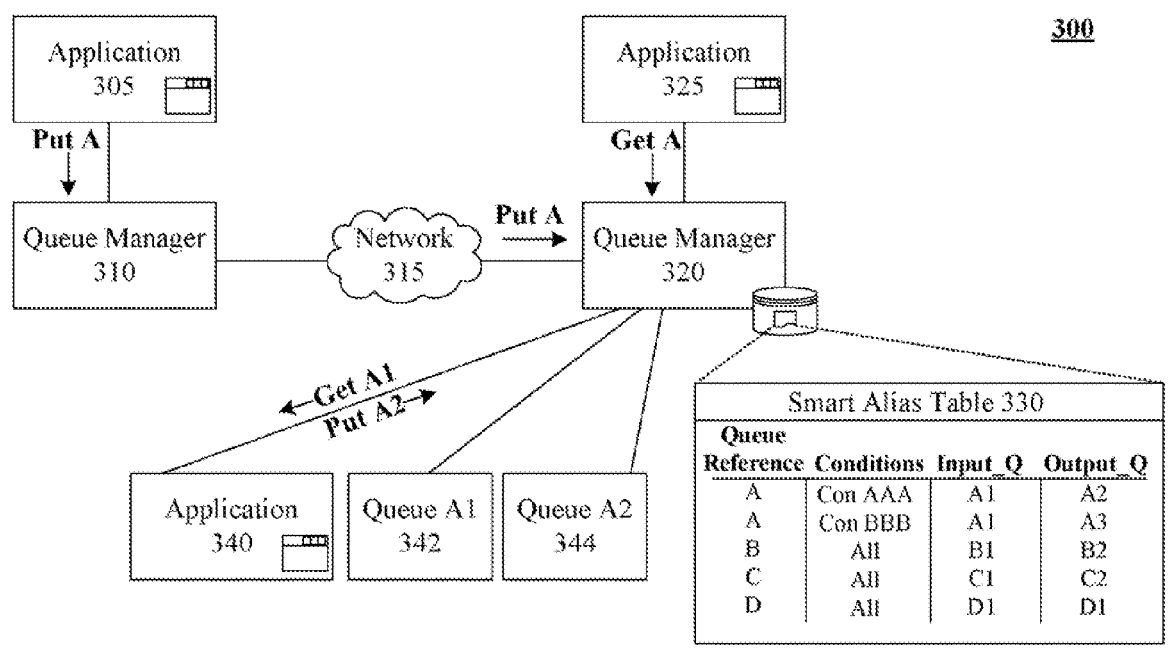
FIG. 3 is a schematic diagram of a system of a queue manager having a smart aliasing capability in accordance with an embodiment of the inventive arrangements disclosed herein.

FIG. 3 is a schematic diagram of a system 300 of a queue manager 320 having a smart aliasing capability in accordance with an embodiment of the inventive arrangements disclosed herein. The queue managers 320 can accept messages from one or more application 305, 325 that reference an original queue. For example, application 305 can originate a request to PUT (e.g., HTTP PUT) a message in to Queue A. Application 325 can submit a request to GET (e.g., HTTP GET) a message from Queue A, which can be used to retrieve the message PUT in a queue by application 305. The queue manager 320 (or manager 310) can establish two aliases for Queue A, which includes a Queue A1 for placing input and a Queue A2 for retrieving input, as shown by Table 230. An application 340 can execute between the split queues 342-344. That is, the application 340 can execute against each new item placed in Queue A1 (342). After executing, the processed item can be placed in Queue A2 (344). In other words, application 340 can GET a message form Queue A1 (342), can execute using the message as input, and can then PUT the processed message to Queue A2 (344). Smart aliasing can be implemented within queue manager 310 and/or queue manager 320. Queue managers 310 and 320 can be connected to each other over network 315.

Conventional queue aliasing always converts references to one queue (e.g., Queue A) into a different/fixed identifier (e.g., Queue A1). The smart aliasing performed in system 300, converts references to one queue (e.g., Queue A) into more than one reference (e.g., Queue A1, Queue A2, and Queue A3) based upon predetermined criteria. This criteria can be managed by table 230. In one embodiment, an interface (not shown) can be provided to permit a queue 320 administrator to adjust the predetermined criteria. As shown in table 330, a smart aliasing function can convert all input requests referring Queue B so that Queue B1 is referenced instead. The smart aliasing function can convert all output request referring to Queue B so that Queue B2 is referenced instead. Similarly, input requests for Queue C can be smart alias converted to Queue C1 references, while output requests for Queue C1 can be smart alias converted to Queue C2 references.

Additionally, a set of variable conditions can be present, which when evaluated determine how a queue reference is interpreted. For example, when a Condition AAA evaluates as TRUE, input requests for Queue A can be smart alias converted to Queue A1 references, while output requests for Queue A can be smart alias converted to Queue A2 references. When a Condition BBB evaluates as TRUE, input requests for Queue A can be smart alias converted to Queue A1 references, while output requests for Queue A can be smart alias converted to Queue A3 references. Any programmatically evaluate-able set of conditions can be specified for smart alias interpretation purposes.

In one embodiment, when multiple conditions are present for interpreting a queue reference, these conditions can be evaluated in a top-down order, where conditions are evaluated until a previous condition is evaluated as TRUE. For instance, when Condition AAA and Condition BBB both evaluate as TRUE, then smart alias references associated with Condition AAA will be used, and Condition BBB will not be evaluated.

Table 330 also shows that a queue reference can be treated like a conventional alias. For example, Queue D can initially reference aliased Queue D1 when the applications 305, 325 are initially deployed. After deployment, additional processing, represented by application 340 related to the queue can be added. Output can be shifted from Queue D1 to Queue D2, application 340 can execute on new messages added to Queue D1, and the message can be transferred to Queue D2 after processing. Because both the applications 305 and 325 still reference a Queue named D, the change is transparent to the applications 305, 325. Queues named B and C of table 330 are split in this manner to permit execution of application 340 between queues.

Additionally, in system 300 a set of variable conditions can be established, which change how the queue manager 320 handles queues. For example, it can be desirable to distribute a queue among multiple different physical storage queues. For instance, message volume can be overloading Queue A2 and an administrator could desire to spread the message volume between Queue A2 and Queue A3 so that Queue A2 is not overloaded. In this situation, conditions can be established to share the load—for example, every other message can be placed in Queue A2 according to the conditions (Con AAA and Con BBB).

As used in system 300, a queue manager 310, 320 can be a software program, which receives, stores, delivers, and otherwise manages messages. Handling of the messages by the queue managers 310 and 320 can be configured by an administrator. One or more of the queue managers 310, 320 can include the smart aliasing function as described herein. The queue managers 310, 320 can handle any type of message queuing, which includes queuing HTTP messages, which are GET, PUT, or BROWSED using HTTP commands.

In one embodiment, each queue manager 310, 320 can execute within computing machine, which also executes an application 305, 325. In a different implementation configuration, one or more of the queue managers 310, 320 can execute in a separate network element or computing device from that of the application 305 or 325. For example, a storage server (not shown) can execute a queue manager 310 or 320 for applications 305, 325 that execute on a different client.

The managed queues 342, 344 and the data store in which the smart alias table 330 is stored can be physically implemented within any type of hardware including, but not limited to, a magnetic disk, an optical disk, a semiconductor memory, a digitally encoded plastic memory, a holographic memory, or any other recording medium. Each of the queues 342, 344 or data stores can be a stand-alone storage unit as well as a storage unit formed from a plurality of physical devices which may be remotely located from one another. Additionally, information can be stored within each data store or queue in a variety of manners. For example, information can be stored within a database structure or can be stored within one or more files of a file storage system where each file may or may not be indexed for information searching purposes. Information stored in data stores or queues can also be optionally encrypted for added security.

The network 315 can include any hardware/software/firmware necessary to convey digital content encoded within carrier waves. Content can be contained within analog or digital signals and conveyed through data or voice channels and can be conveyed over a personal area network (PAN) or a wide area network (WAN). The network 315 can include local components and data pathways necessary for communications to be exchanged among computing device components and between integrated device components and peripheral devices. The network 315 can also include network equipment, such as routers, data lines, hubs, and intermediary servers which together form a packet-based network, such as the Internet or an intranet. The network 315 can further include circuit-based communication components and mobile communication components, such as telephony switches, modems, cellular communication towers, and the like. The network 315 can include line based and/or wireless communication pathways.

The smart aliasing function can be implemented within a queue manager 320 that is specifically designed to include the smart alias capability. Additionally, the smart alias function can be added as an enhancement to a pre-existing queue manager 320, such as one that already includes a basic alias capability like Websphere Message Queue (MQ). At present, Websphere MQ implements aliasing of queues at OPEN (or MQOPEN) time. Suppose a Websphere MQ administrator creates a queue alias "A" for the target queue "A1". When an application OPENs queue "A", Websphere MQ actually opens queue "A1" and returns a handle for queue "A1" to the application. Subsequent actions (GET, PUT, or BROWSE) by the application use this handle. Thus the alias is resolved at OPEN time and subsequent WMQ processing is the same as if the application had referred directly to queue "A1."

System 300 can enhance this basic alias function of Websphere MQ by inserting smart alias processing at the same point in the queue manager's logic—that is, at the point where existing alias processing occurs. The smart alias can select from two queues based on the MQOPEN options and returns the handle for the selected queue.

An extension to queue manager 320 for smart aliasing is made possible an existing Websphere MQ constraint that an alias cannot have the same name as a real queue is removed. We can then use a rule that whenever an alias and a real queue have the same name, the alias is used first unless the application specifies otherwise. This allows us to insert extra processing non-disruptively (that is, without a service outage).

To illustrate, suppose we already have a queue called "A." Applications PUT to queue "A" and a server application GETs and processes the messages. Suppose we now want to add some processing that uses or affects messages after they are PUT to "A" but before they are got. We first write an application to do the extra processing. This application GETs from a new queue, "A1" and PUTs each message to queue "A" (specifying that this refers to the real queue "A," even if an alias "A" also exists).

We can now define a queue splitting smart alias called "A" which selects queue "A1" when the MQOPEN is for PUT and queue "A" when the MQOPEN is for GET or BROWSE. This new smart alias can be created and brought into use non-disruptively. The application which GETs and processes messages from queue "A" is unaffected by adding the alias. Applications which PUT messages to "A" continue to do so until they close and reopen "A"—at which time their PUT requests are redirected to queue "A1" where they are subjected to the new processing before they arrive at the real queue "A".

In a variant of this, we can allow the application which inserts extra processing between PUTs to and GETs from queue "A" to use the alias. For this, we add a new indicator (say OPEN_FOR_MEDIATE) to the open request. This allows both the existing application code and the new "mediation" code to refer to queue "A" with the effects as shown in the following table:

|  | OPEN_FOR_MEDIATE = FALSE | OPEN_FOR_MEDIATE = TRUE |
|---|---|---|
| OPEN for PUT | Opens "A1" | Opens "A" |
| OPEN for GET or BROWSE | Opens "A" | Opens "A1" |

To fan out a queue, the smart alias object (say "A") can be configured to select from a set "A1", "A2", "A3", and so on either using a round-robin or at random (clearly there are other possibilities). We then deploy our set of applications (or multiple instances of the same application) such that each application (or application instance) GETs from a different queue from the set "A1", "A2", "A3", and so on. The set of applications which do the GETs does not need to (and does not) use the alias object "A," each application or instance uses "A1" and "A2" directly.

More generally, the predetermined criteria used by the smart alias to choose from the set of queues can be arbitrarily complex. This can be achieved by having the smart alias include customer-specified rules and/or a customer-written program. It will be apparent that other variants on the smart, alias concept are feasible.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method of queuing electronic messages comprising:
   receiving a first command at a queue manager executed on a computer to place an electronic message in a queue that digitally stores electronic messages, said first command referring to a queue using a first reference and received from a sending application;
   mapping the first reference to a second reference for message intake purposes based on the first command, performed by the queue manager, where the second reference is a unique reference for a first queue;
   storing the received electronic message in the first queue, performed by the queue manager using the second reference;
   moving the electronic message from the first queue to a second queue; receiving a second command at the queue manager from a receiving application to retrieve the electronic message from a queue that digitally stores electronic messages, said second command referring to a queue using the first reference;
   mapping the first reference to a third reference based on the second command for message retrieval purposes, performed by the queue manager, where the third reference is a unique reference for the second queue, which is different from the first queue; and
   retrieving the electronic message from the second queue using the third reference and conveying the received electronic message from the second queue to the receiving application responsive to the second command;
   establishing a smart alias for the first queue and the second queue, wherein the first reference is smart aliased against the first queue for message intake purposes, and wherein the second reference is smart aliased against the second queue for message output purposes.

2. The method of claim 1, wherein the first command is a PUT command, wherein the second command is at least one of a GET command and a BROWSE command.

3. The method of claim 2, wherein the first command and the second command are HyperText Transfer Protocol (HTTP) complaint commands.

4. The method of claim 1, further comprising:
   establishing a smart alias for the first queue and the second queue, wherein the first reference is smart aliased against the first queue for message intake purposes, and wherein the second reference is smart aliased against the second queue for message output purposes.

5. The method of claim 4, wherein the first command is a PUT command, wherein the second command is at least one of a GET command and a BROWSE command.

6. The method of claim 4, further comprising:
   the queue manager having a smart alias capability defines programmatic instructions that cause a computing machine executing the defined programmatic instructions to perform the steps of claim 1, wherein the queue manager is stored in a non-transitory computer readable medium.

7. The method of claim 1, wherein the receiving application and the sending application are remotely located from each other and executed separate computer hardware, and wherein the receiving application and the sending application are connected via a network over which the electronic message is conveyed.

8. The method of claim 7, wherein the programmatic action is executed by a queue application, which was defined and inserted into a queue process as additional processing after the sending application and the receiving application were deployed, wherein the method is performed without modification to the sending application and without modification to the receiving application.

9. The method of claim 1, wherein is implemented by at least one machine in accordance with at least one computer program having a plurality of code sections that are executable by the at least one machine, said at least one computer program being stored in a machine readable medium.

10. The method of claim 1, wherein the queue manager is a first queue manager, the first command is received at the first queue manager from the sending application via a second queue manager.

11. The method of claim 1, wherein mapping the first reference to the second reference is performed by evaluating a set of conditions upon receiving the first command to determine the second reference from a plurality of references to corresponding plurality of queues.

12. A computer program product for queuing electronic messages comprising computer program code stored on a non-transitory medium, wherein when the computer program code is executed by one or more computing machines the computer program code causes the one or more computing machines to:
   receive a first command at a queue manager executed on a computer to place an electronic message in a queue that digitally stores electronic messages, said first command referring to a queue using a first reference and received from a sending application;
   map the first reference to a second reference for message intake purposes based on the first command, performed by the queue manager, where the second reference is a unique reference for a first queue;
   store the received electronic message in the first queue, performed by the queue manager using the second reference;
   move the electronic message from the first queue to a second queue; receive a second command at the queue manager from a receiving application to retrieve the electronic message from a queue that digitally stores electronic messages, said second command referring to a queue using the first reference;
   map the first reference to a third reference based on the second command for message retrieval purposes, performed by the queue manager, where the third reference is a unique reference for the second queue, which is different from the first queue; and retrieve the electronic message from the second queue using the third reference and convey the received electronic message from the second queue to the receiving application responsive to the second command;

establishing a smart alias for the first queue and the second queue, wherein the first reference is smart aliased against the first queue for message intake purposes, and wherein the second reference is smart aliased against the second queue for message output purposes.

13. The computer program product of claim 12, wherein the first command is a PUT command, wherein the second command is at least one of a GET command and a BROWSE command.

14. The computer program product of claim 13, wherein the first command and the second command are HyperText Transfer Protocol (HTTP) complaint commands.

15. The computer program product of claim 12, wherein the computer program code causes the at least one computing machine further to:

execute a programmatic action, which uses at least a portion of the electronic message as input, subsequent to storing the electronic message in the first queue; and after executing the programmatic action, perform the moving the electronic message from the first queue to the second queue.

16. The computer program product of claim 15, wherein the computer program code causes the at least one computing machine further to:

establish a smart alias for the first queue and the second queue, wherein the first reference is smart aliased against the first queue for message intake purposes, and wherein the second reference is smart aliased against the second queue for message output purposes.

17. The computer program product of claim 12, wherein the queue manager is a first queue manager, the first command is received at the first queue manager from the sending application via a second queue manager.

18. The computer program product of claim 12, wherein the computer program code for that causes the at least one computing machine to map the first reference to the second reference comprises computer program code which causes the at least one computing machine to evaluate a set of conditions upon receiving the first command to determine the second reference from a plurality of references to corresponding plurality of queues.

* * * * *